US006609747B1

(12) United States Patent
Ruiz

(10) Patent No.: US 6,609,747 B1
(45) Date of Patent: Aug. 26, 2003

(54) RECREATIONAL VEHICLE SHUTTER SYSTEM

(76) Inventor: Primitivo F. Ruiz, P.O. Box 2134, Clackamas, OR (US) 97015

( * ) Notice: Subject to any disclaimer, the term of this patent is extended or adjusted under 35 U.S.C. 154(b) by 0 days.

(21) Appl. No.: 10/066,959

(22) Filed: Feb. 6, 2002

(51) Int. Cl.[7] .................................................. B60J 1/20
(52) U.S. Cl. ........................ 296/95.1; 160/127; 49/61
(58) Field of Search ............................ 296/95.1, 96.19, 296/97.5, 97.8, 97.11; 160/370.21, 370.22, 127; 49/61, 63

(56) References Cited

U.S. PATENT DOCUMENTS

| | | | | |
|---|---|---|---|---|
| 266,840 A | * | 10/1882 | Poirier | 451/291 |
| 2,568,195 A | * | 9/1951 | Jones | 49/464 |
| 2,611,936 A | * | 9/1952 | Wheeler | 160/54 |
| 3,033,281 A | * | 5/1962 | Monin | 160/19 |
| 3,391,724 A | * | 7/1968 | Charlesworth | 160/370.21 |
| 4,294,038 A | * | 10/1981 | Davidson | 49/63 |
| 4,457,106 A | * | 7/1984 | Forquer | 49/158 |
| 4,784,215 A | * | 11/1988 | Sing | 165/41 |
| 4,973,098 A | * | 11/1990 | McFall | 296/95.1 |
| 4,991,349 A | * | 2/1991 | Barthelemy | 49/61 |
| 5,123,468 A | * | 6/1992 | Mater, Jr. | 150/168 |
| 5,232,244 A | * | 8/1993 | Itoh | 280/749 |
| 5,401,074 A | * | 3/1995 | Timerman | 296/136 |
| 5,456,515 A | * | 10/1995 | Dang | 296/95.1 |
| 5,697,416 A | * | 12/1997 | Bock et al. | 150/168 |
| 6,015,180 A | * | 1/2000 | Beuerle | 296/95.1 |
| 6,241,303 B1 | * | 6/2001 | Yee | 296/95.1 |
| 6,318,426 B1 | * | 11/2001 | Thomas | 150/166 |
| 6,407,365 B1 | * | 6/2002 | De Prete, III | 219/203 |

FOREIGN PATENT DOCUMENTS

| | | | | |
|---|---|---|---|---|
| DE | 3104746 A1 | * | 9/1982 | 296/95.1 |
| DE | 3140756 A1 | * | 4/1983 | 296/156 |
| FR | 622633 | * | 6/1927 | 296/95.1 |
| JP | 56-21915 | * | 2/1981 | 296/96.19 |
| JP | 5-310046 A | * | 11/1993 | 296/95.1 |

* cited by examiner

*Primary Examiner*—D. Glenn Dayoan
*Assistant Examiner*—Patricia Engle

(57) ABSTRACT

A shutter system for a recreational vehicle is mounted on upper and lower rails on an outside of a side wall of the recreational vehicle adjacent the side windows of the vehicle. The shutter system includes a pair of shutters which are moveable on the upper and lower rails and a warm air supply. The warm air supply blows warm air over the outside surface of the window to defrost or defog the windows.

3 Claims, 2 Drawing Sheets

RECREATIONAL VEHICLE SHUTTER SYSTEM

FIELD OF INVENTION

This invention relates to a shutter system for a recreational vehicle which provides hot air to the window to de-ice or defog windows of a recreational vehicle.

BRIEF SUMMARY OF THE INVENTION

The primary purpose of this invention is to provide a shutter system for a recreational vehicle which includes a heated air supply to de-ice or defog the windows of a recreational vehicle. Another advantage of the shutter system is that it protects the windows from sun, hail, dirt or thrown objects and makes break-ins more difficult.

The shutter system includes solid lightweight insulated panels that roll on a track outside of the vehicle. Heated air is supplied by a heater and piped to the windows by a small tubing which blows air over the outside of the window. The shutter system can be automatically or manually operated from inside the vehicle.

In addition to the shutter system a roll-up curtain is provided on the windshield of the vehicle. The roll-up curtain, which can be heated either by heated air or by electric heating elements or unheated, includes guides on each side.

The shutter system can vary in color size and style to match the decor of the vehicle. The shutters could be constructed from wood, aluminum, copper, plastic, etc. The shutter system is not limited to use on recreational vehicles. The system could be adapted for use on aircraft, long haul trucks, pleasure boats, homes, hotels, etc.

DETAILED DESCRIPTION OF THE DRAWINGS

Figure 1:
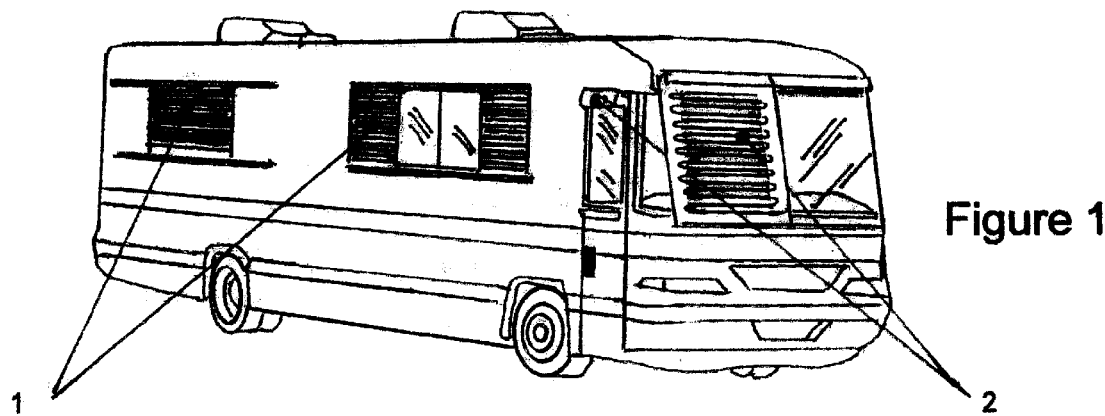
FIG. 1 shows a recreational vehicle with the shutter system and the roll-up curtain of the present invention.
Figure 2:
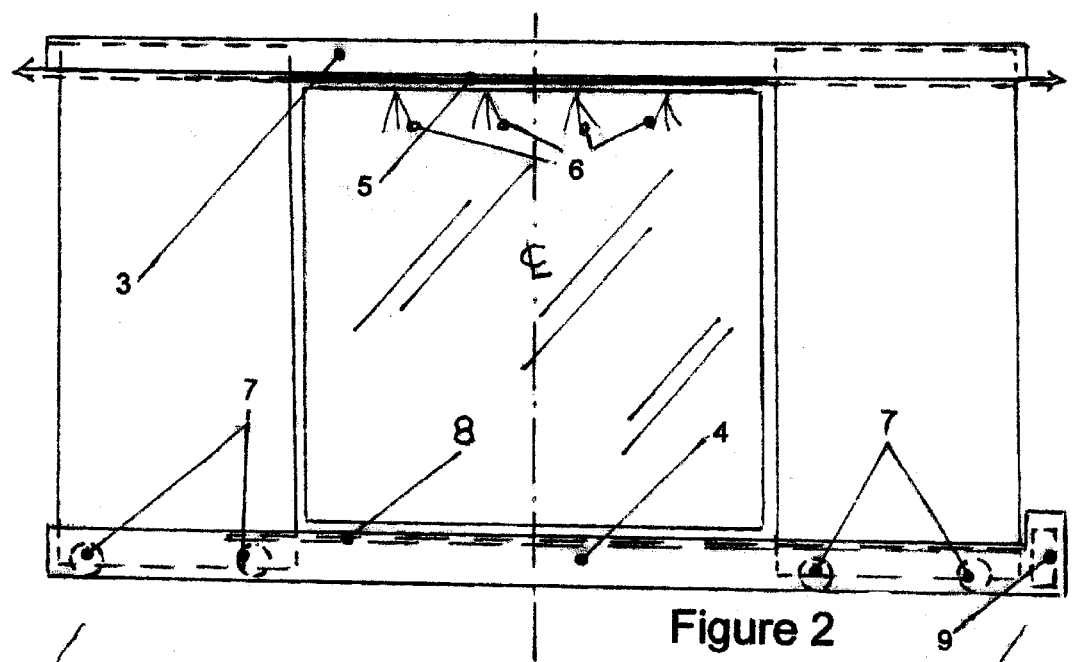
FIG. 2 shows a detail drawing of the window of the recreational vehicle and the shutter system of the present invention.
Figure 3:
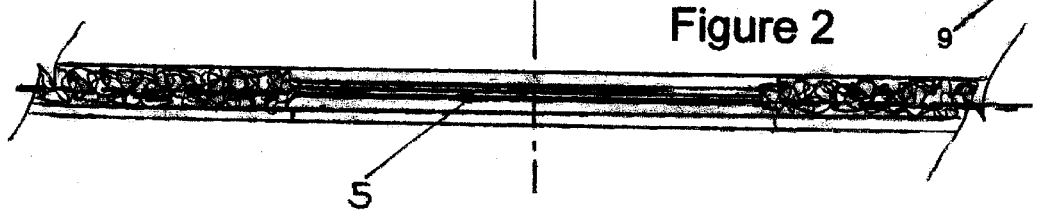
FIG. 3 is a horizontal cross section of the window showing the location of the heated air delivery tube.
Figure 4:
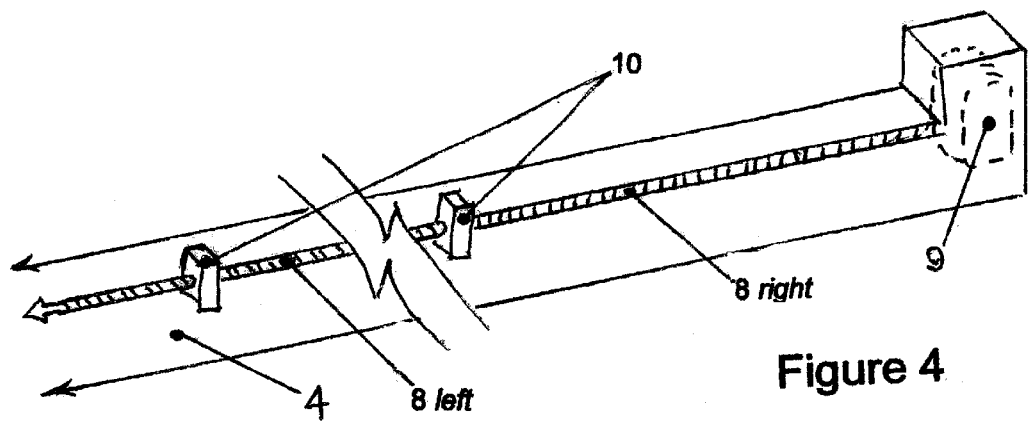
FIG. 4 shows the preferred embodiment for the opening and closing the shutters.
Figure 5:
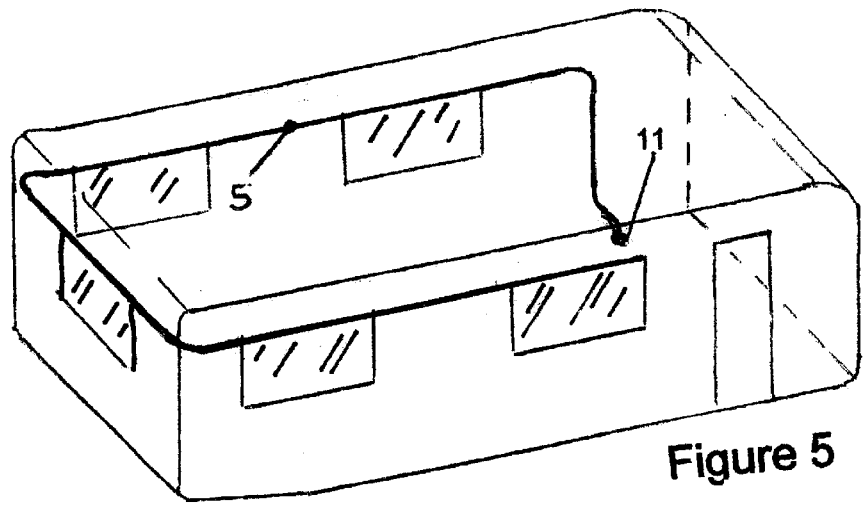
FIG. 5 shows the location of the heated air delivery system throughout the entire vehicle.

The following description id for a shutter system which is a decorative, insulating, protective, moveable, remotely controlled shutter that will enclose a very thin layer of heated air that will de-ice the windows in cold weather and defog the windows in warm humid weather.

The shutters (1) could be transparent, semitransparent or opaque. The shutters (1) are insulating and compliment the decor of the recreational vehicle. Imbedded in the bottom of each shutter is two small wheels or casters (7). The function of the wheels (7) if to cause the shutter to move freely along a lower guide track (4). The wheels (7) are to project below the bottom edge of the shutter (1) no more than ¼ inch.

The shutters are supported and guided by an upper guide channel (3) and a lower guide channel (4). The upper guide channel (3) is an inverted U-shape and is closed at both ends. The lower guide channel (4) is U-shaped and is closed at one end. The other end encloses an electric motor (9). The shutters (1) are moved by means of a threaded drive rod (8) which passes through lugs (10) that are attached to the lower underside of each shutter. As the drive rod (8) is turned by the electric motor (9), which may be geared down, the shutters are caused to move. The threads are right handed (8r) at one end and left handed (8/) at the other end. The threaded drive rod and lugs behave similarly to a turnbuckle. By rotating the rod both shutters will move toward or away from the center, depending on whether the drive rod is turned clockwise or counterclockwise. The motor (9) is to have an overload switch so that the motor will shut off when the shutters are fully closed or fully opened. As seen in FIG. 1, there is more than one shutter system on the recreational vehicle. The motors for each shutter system could be remotely operated individually or all at once.

Figure 6:
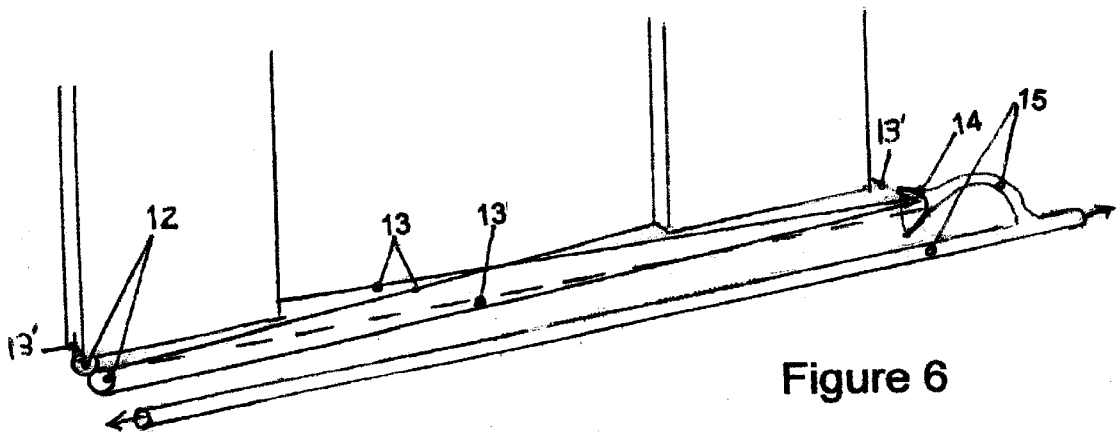
FIG. 6 shows an alternative embodiment for opening and closing the shutters.

FIG. 6 shows an alternate embodiment to move the shutters. The alternate embodiment involves moving the shutters with cords or cables. In this embodiment, one pair of cables or cords (13) is attached to an inside edge of the shutters to close the shutters. A second pair of cables or cords (13') is attached to an outside edge of the shutters to open the shutters. The cables (13,13') are run through an ½ inch tubing around the vehicle to take all of the cables for all of the windows to a central opening where the cables could be operated by a hand crank or a motor. At the window with the shutter system, the cables (13,13') are lead away from the central tubing by a shorter tubing which leads to the window. At the window the cables (13,13') are protected by a cone shield (14). One of each of the cables or cords (13,13') is run over a pulley (12) to allow the cable to be attached to edges of the cables which are not facing the cone shield.

The heated air is supplied by a ¼ inch tube (5) and is concealed in the wall of the vehicle. The tube (5) goes all the way around the vehicle at the height of the window. At the window opening the tube (5) is located behind the shutter and outside of the window. In the area where the tube (5) passes in front of the window there are 4 to 6 small holes which allow the heat air (6) to escape. Any of several systems could be used to heat the air and force it through the heated air supply tube (5).

The shutter system is operable from inside the vehicle.

An additional feature of the window shutter system is a roll up electrically heated curtain (2) which is a standard application to complete the protection afforded by the shutters.

What is claimed is:

1. A recreational vehicle in combination with a shutter system, the recreational vehicle including at least one window in two exterior side walls, the shutter system comprising:

at least one pair of shutters moveable on upper and lower rails, the upper and lower rails are mounted on at least one of the two exterior side walls above and below the window;

a heated air supply tube which is located above the window between the window and the at least one pair of shutters, the heated air supply tube includes openings which allow heated air to escape the tube and pass over the window to de-ice or defog the window.

2. The recreational vehicle of claim 1, wherein the at least one pair of shutters are moveable on the upper and lower rails by a threaded rod connected to lugs which are attached to a bottom edge of each of the at least one pair of shutters, the threaded rod is connected to a motor which rotates the rod, the rotation of the rod causes the lugs to move along the threaded rod to open or close the shutters.

3. The recreational vehicle of claim 1, wherein the at least one pair of shutters are moveable on the upper and lower rails by two pairs of cables which are connected to an lower edge of each of the at least one pair of shutters, wherein one pair of cables opens the shutters and the second pair of cables close the shutters.

* * * * *